United States Patent Office 3,547,967
Patented Dec. 15, 1970

3,547,967
PHENOXYPHENYLPHENOXARSINES
Chun-Shan Wang, Republic of China, and Thomas W. McGee, Midland, Mich., assignors to The Dow Chemical Company, Midland, Mich., a corporation of Delaware
No Drawing. Filed July 15, 1968, Ser. No. 744,646
Int. Cl. C07d *105/06*
U.S. Cl. 260—440      4 Claims

ABSTRACT OF THE DISCLOSURE

Phenoxyphenylphenoxarsines as new compounds useful as pesticides.

---

The present invention relates to novel and useful phenoxarsine derivatives and, in particular, to phenoxyphenylphenoxarsines which can be represented by Formula A:

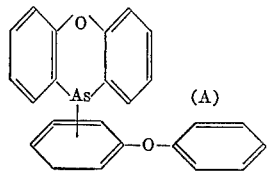

Thus included within the scope of the instant invention are 10-(2-phenoxyphenyl)phenoxarsine, 10-(3-phenoxyphenyl)phenoxarsine, and 10-(4-phenoxyphenyl)phenoxarsine. These compounds are white crystalline solids at room temperature. They are useful as pesticides for the control of fungal and plant and insect pests such as the causative agents of downey mildew, tomato late blight, and rice blast; beans and weeds; and worms and yellow fever mosquito.

The compounds of the present invention are prepared by reacting together 10-chlorophenoxarsine and phenoxyphenyl-2-magnesium chloride, phenoxyphenyl-3-magnesium chloride, or phenoxyphenyl-4-magnesium chloride. The reaction is conducted in an anhydrous liquid reaction medium. Suitable media include the common organic solvents or mixtures thereof such as dimethylformamide, tetrahydrofuran, diethylether, hexane, dimethylsulfoxide, methylene chloride and so forth. The amounts of the reactants to be employed are not critical, some of any of the desired products being formed when employing any proportions of reagents. However, the reaction consumes the reagents in the proportion of one mole of 10-chlorophenoxarsine per mole of phenoxyphenylmagnesium chloride compound and the employment of such proportions is usually preferred. The reaction is preferably conducted under anhydrous conditions and, preferably, under a dry, inert atmosphere such as argon, nitrogen, and so forth. Where optimum yields are desired, such conditions are maintained. The reaction proceeds smoothly at temperatures of from 0° to 100° C. and conveniently at the boiling point and under reflux.

In conducting the reaction, the 10-chlorophenoxarsine and phenoxyphenylmagnesium chloride compound are contacted with one another in any convenient order or fashion. In a preferred manner, the 10-chlorophenoxarsine is added to a solution of phenoxyphenylmagnesium chloride reactant dispersed in liquid reaction medium. The reactants are then maintained together within the given temperature range for a period of time sufficient to complete the reaction. The reaction mixture is then conventionally processed to separate and isolate product. Such processing includes filtration, extraction, distillation, chromatography, and the like.

The following examples illustrate the present invention but, as such, are not to be construed as limiting.

EXAMPLE 1

Phenoxyphenyl-3-magnesium chloride is prepared by reacting magnesium with 3-chlorophenyl phenyl ether. In such operation, 40.9 grams (0.200 mole) of 3-chlorophenyl phenyl ether is dispersed in 100 milliliters of dry tetrahydrofuran. Twenty milliliters of the resulting solution together with 0.3 milliliter of ethyl bromide are mixed with 5.3 grams (0.25 mole) of magnesium turnings with heating at 60°–70° C. Following this addition, the remaining 80 milliliters of the 3-chlorophenyl phenyl ether in tetrahydrofuran solution is mixed with the magnesium turnings at a rate sufficient to maintain the temperature of the reaction mixture at the boiling point and under gentle reflux. This addition is conducted over a 60 minute period. Following the addition, the temperature of the reaction mixture is maintained at the boiling point and under reflux for six hours. 10-chlorophenoxarsine (20 grams; 0.072 mole) dispersed in 50 milliliters of tetrahydrofuran is added, dropwise and with stirring, to the above prepared reaction mixture containing the phenoxyphenyl-3-magnesium chloride. This addition is carried out over a period of 30 minutes and, following this time, the temperature of the resultant mixture is heated at the boiling point and under reflux for 16 hours. Following this heating period, the reaction mixture is cooled and filtered to remove unreacted magnesium. The filtrate is concentrated to a volume of 30 milliliters on a rotary evaporator. The brown concentrate is recrystallized from ethanol containing a small amount of decolorizing agent (Norit). Water is added to the ethanol solution which precipitates sticky, yellow crystals. These are collected by filtration and recrystallized twice from acetone-ethanol to obtain the desired 10-(3-phenoxyphenyl)phenoxarsine product as white needles melting at from 99°–100° C.

EXAMPLE 2

By following the procedure of Example 1, the 10-(2-phenoxyphenyl)phenoxarsine product is obtained as a white solid melting at from 95°–96° C. by reacting together phenoxyphenyl-2-magnesium chloride and 10-chlorophenoxarsine.

EXAMPLE 3

By following the procedure of Example 1, the 10-(4-phenoxyphenyl)phenoxarsine product is obtained as a white solid melting at from 84°–85° C. by reacting together phenoxyphenyl - 4 - magnesium chloride and 10-chlorophenoxarsine.

The compounds of the present invention are useful as pesticides for the control of a wide variety of fungal, plant, and insect pests such as *Bacillus subtilis, Aspergillus terreus,* pigweeds, chlorella algae, flies, and roaches. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 1 to about 5000 parts per million of one or more of the compounds.

In representative operations, each of 10-(2-phenoxyphenyl)phenoxarsine and 10-(3-phenoxyphenyl)-phenoxarsine gives complete controls and kills of the organisms *Candida albicans, Trichophyton mentagrophytes, Bacil-*

*lus subtilis, Aspergillus terreus, Candida pelliculosa,* and *Pullularia pullulans* when one of the named compounds is separately applied to the environments containing and supporting thriving members of one of such organisms at concentrations of 500 parts per million by weight.

In further operations, 10-(4-phenoxyphenyl)-phenoxarsine gives substantially complete controls and kills of beans when applied to the growth medium of such at pre-emergent stages via drenches with aqueous compositions containing the named compound as the sole toxicant at a dosage of ten pounds per acre.

In additional operations, 10-(3-phenoxyphenyl)-phenoxarsine gives substantially complete controls and kills of yellow fever mosquitoes when such are contacted with aqueous compositions containing the named compound at a concentration of five parts per million by weight.

10-chlorophenoxarsine is a known compound and can be prepared in accordance with known methods. 2-chlorophenyl phenyl ether is prepared by the condensation of potassium phenate and 2-bromochlorobenzene at about 125°–127° C. for about 10 hours using a copper catalyst. Similarly, 3-chlorophenyl phenyl ether is obtained utilizing potassium phenate and 3-bromochlorobenzene. The direct chlorination of diphenyl ether in glacial acetic acid at room temperature gives the 4-chlorophenyl phenyl ether in predominant amounts. The preparation of the corresponding Grignard reagent of these three compounds follows via the classical method upon reaction thereof with magnesium metal. This reaction is preferably conducted under anhydrous conditions and under an inert atmosphere. The reaction is catalyzed with small and catalytic amounts of initiator such as ethyl bromide, iodine, methyl iodide, and the like.

What is claimed is:

1. The compound corresponding to the formula

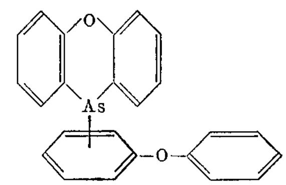

2. The compound claimed in claim 1 which is 10-(2-phenoxyphenyl)phenoxarsine.

3. The compound claimed in claim 1 which is 10-(3-phenoxyphenyl)phenoxarsine.

4. The compound claimed in claim 1 which is 10-(4-phenoxyphenyl)phenoxarsine.

References Cited

UNITED STATES PATENTS

| | | | |
|---|---|---|---|
| 2,767,114 | 10/1956 | Urbschat et al. | 260—440X |
| 3,036,107 | 5/1962 | Dunbar | 260—440 |
| 3,038,921 | 6/1962 | Strycker et al. | 260—440 |
| 3,149,133 | 9/1964 | Strycker | 260—440X |
| 3,197,494 | 7/1965 | Strycker | 260—440 |
| 3,197,495 | 7/1965 | Strycker | 260—440 |

HELEN M. McCARTHY, Primary Examiner

W. F. W. BELLAMY, Assistant Examiner

U.S. Cl. X.R.

424—297